US012023932B2

(12) United States Patent
Ueno

(10) Patent No.: US 12,023,932 B2
(45) Date of Patent: Jul. 2, 2024

(54) IMAGE FORMING APPARATUS

(71) Applicant: KYOCERA Document Solutions Inc., Osaka (JP)

(72) Inventor: Daijiro Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 132 days.

(21) Appl. No.: 17/703,462

(22) Filed: Mar. 24, 2022

(65) Prior Publication Data

US 2022/0314625 A1 Oct. 6, 2022

(30) Foreign Application Priority Data

Mar. 30, 2021 (JP) ................................ 2021-057093

(51) Int. Cl.
*B41J 2/165* (2006.01)

(52) U.S. Cl.
CPC ....... *B41J 2/16544* (2013.01); *B41J 2/16535* (2013.01); *B41J 2/16585* (2013.01); *B41J 2/16508* (2013.01)

(58) Field of Classification Search
CPC ................ B41J 2/16544; B41J 2/16535; B41J 2/16585; B41J 2/16508; B41J 2002/16591; B41J 2/16547
See application file for complete search history.

(56) References Cited

U.S. PATENT DOCUMENTS 8,544,985 B2 * 10/2013 Heo .................... B41J 2/16547 347/22

FOREIGN PATENT DOCUMENTS

JP 2013049205 A 3/2013

* cited by examiner

*Primary Examiner* — Geoffrey S Mruk
(74) *Attorney, Agent, or Firm* — Studebaker & Brackett PC

(57) ABSTRACT

An image forming apparatus includes a recording head, a wiping unit and a moving mechanism. The recording head has a nozzle area where a plurality of ink ejection ports is opened downward. The wiping unit is moved in a first direction with coming into contact with the nozzle area and wipes the ink ejection ports. The moving mechanism performs a wiping operation and a returning operation. The moving mechanism includes a first drive source and a guide part. The first drive source moves the wiping unit in the first direction and in the second direction. The guide part guides the wiping unit in the first direction in the wiping operation, and guides the wiping unit in the first direction so as to separate the wiping unit from the nozzle area downward and then guides the wiping unit in the second direction in the returning operation.

3 Claims, 9 Drawing Sheets

IMAGE FORMING APPARATUS

INCORPORATION BY REFERENCE

This application is based on and claims the benefit of priority from Japanese patent application No. 2021-057093 filed on Mar. 30, 2021, which is incorporated by reference in its entirety.

BACKGROUND

The present invention relates to an inkjet image forming apparatus including a wiping unit which wipes an ink ejection port of a recording head.

The inkjet type image forming apparatus is provided with a wiping unit which wipes an ink ejection port of a nozzle of a recording head supported by a head unit. The wiping unit is configured to come into contact with the nozzle area where the ink ejection port is opened, to be moved in one direction from the wiping start position to the wiping end position, and to wipe the ink ejection port.

When the ink ejection port is wiped twice or more, the wiping unit is moved in one direction from the wiping start position to the wiping end position, is separated from the nozzle area, moved in the reverse direction to the wiping start position, is brought into contact the nozzle area at the wiping start position again, and then is moved in one direction again.

In order to separate the wiping mechanism from the nozzle area, an image forming apparatus may include a lifting mechanism which lifts and lowers the wiping mechanism. The lifting mechanism is disposed below both end portions of the wiping mechanism, and includes a lift member and a shaft fixed to the lower end of the lift member. A roller is rotatably provided at the upper end of the lift member. The roller is engaged with a rail of a support frame of the wiping mechanism in a rotatably movable manner.

When the shaft is turned in one direction, the roller moves along the rail, the lift member is switched from an upright posture to a horizontal posture, and the support frame is lowered. On the other hand, when the shaft is turned to the other direction, the roller moves along the rail, the lift member is switched from the horizontal posture to the upright posture, and the support frame is lifted.

At a time of the wiping operation, after the wiping mechanism is lifted by the lifting mechanism, the wiper (corresponding to the wiping unit) is moved from the wiping start position to the wiping end position. Thereafter, the wiping mechanism is lowered by the lifting mechanism, the wiper is returned from the wiping end position to the wiping start position, and then the wiping mechanism is lifted again by the lifting mechanism.

However, in the above image forming apparatus, after the wiper moves to the wiping end position and after the wiper returns to the wiping start position, it is necessary to lift and lower the wiping mechanism by driving the lifting mechanism. Therefore, when the ink ejection port is wiped twice or more, the wiping time becomes longer because the wiping operation is required to contain the lifting operation. Further, since the number of times when the lifting mechanism is driven increases, the load applied to the lifting mechanism increases, and the life of the lifting mechanism is shortened.

SUMMARY

In accordance with the first aspect of the present disclosure, an image forming apparatus includes a recording head, a wiping unit and a moving mechanism. The recording head has a nozzle area where a plurality of ink ejection ports is opened downward. The wiping unit is moved in a first direction with coming into contact with the nozzle area and wipes the ink ejection ports. The moving mechanism performs a wiping operation to move the wiping unit in the first direction while bringing the wiping unit into contact with the nozzle area from a wiping start position to a wiping end position, and a returning operation to separate the wiping unit downward from the nozzle area after the wiping operation is completed, to move the wiping unit in a second direction opposite to the first direction and then to bring the wiping unit into contact with the nozzle area again at the wiping start position. The moving mechanism includes a first drive source and a guide part. The first drive source moves the wiping unit in the first direction and in the second direction. The guide part guides the wiping unit in the first direction in the wiping operation, and guides the wiping unit in the first direction so as to separate the wiping unit from the nozzle area downward and then guides the wiping unit in the second direction in the returning operation.

In accordance with the second aspect of the present disclosure, an image forming apparatus includes a recording head, a wiping unit and a moving mechanism. The recording head has a nozzle area where a plurality of ink ejection ports is opened downward. The wiping unit is moved in a first direction with coming into contact with the nozzle area and wipes the ink ejection ports. The moving mechanism performs a wiping operation to move the wiping unit in the first direction while bringing the wiping unit into contact with the nozzle area from a wiping start position to a wiping end position, and a returning operation to separate the wiping unit downward from the nozzle area after the wiping operation is completed, to move the wiping unit in a second direction opposite to the first direction and then to bring the wiping unit into contact with the nozzle area again at the wiping start position. The moving mechanism includes a first drive source, a second drive source and a guide part. The first drive source moves the wiping unit in the first direction and in the second direction. The second drive source moves the wiping unit in a third direction intersecting the first direction and the second direction from a wiping position where the wiping unit faces the nozzle area to a housing position where the wiping unit is separated from the nozzle area. The guide part guides the wiping unit in the first direction in the wiping operation, and guides the wiping unit in the third direction so as to separate the wiping unit from the nozzle area downward and then guides the wiping unit in the second direction in the returning operation.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, an image forming apparatus according to one embodiment of the present disclosure will be described with reference to the drawings.

Figure 1:
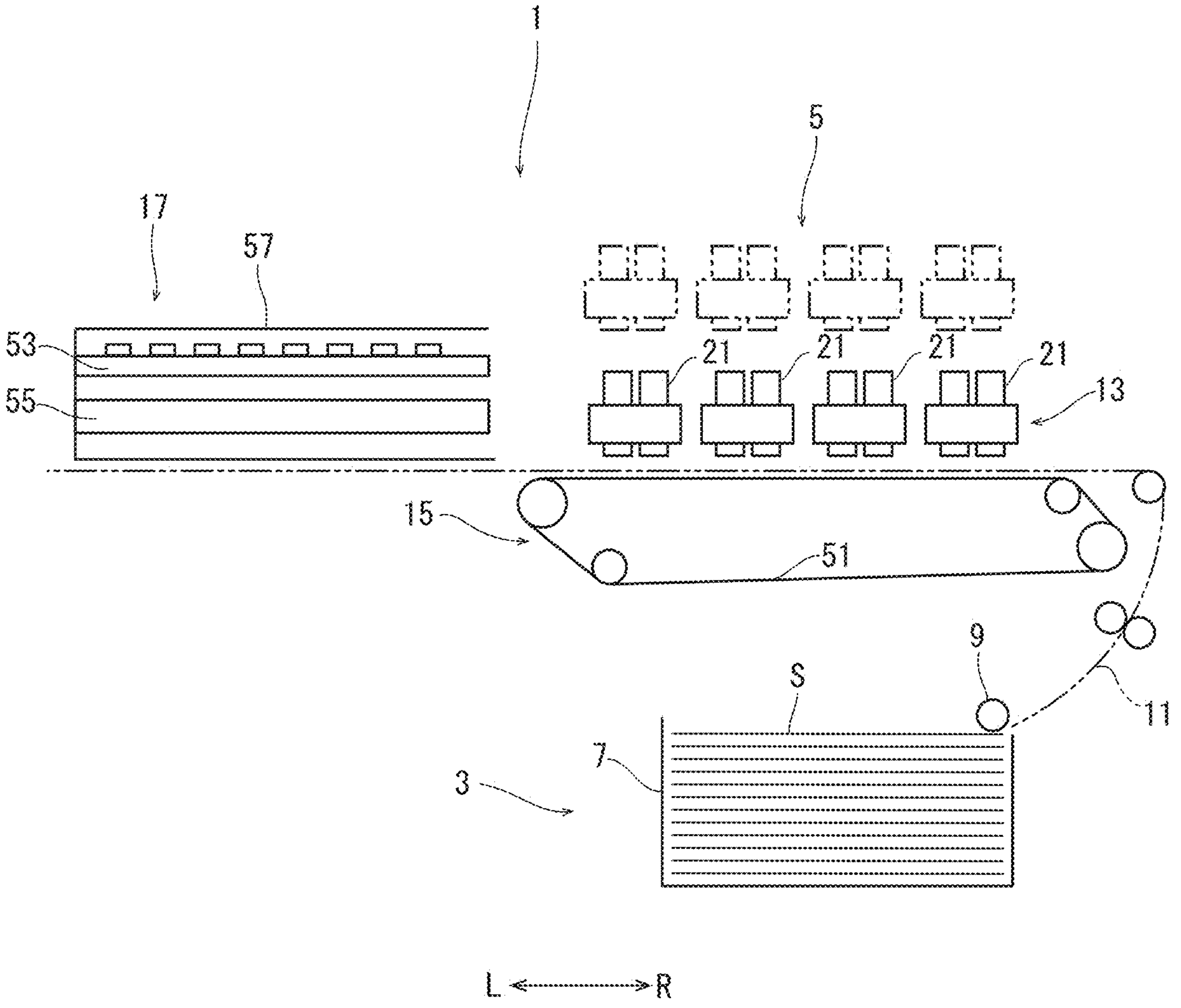
FIG. 1 is a front view schematically showing an inner structure of an image forming apparatus according to one embodiment of the present disclosure.

With reference to FIG. 1, the image forming apparatus 1 will be described. FIG. 1 is a front view schematically showing an internal structure of an image forming apparatus 1 (at a time of an image forming operation). In each figure, Fr, Rr, L and R indicate the front side, the rear side, the left side and the right side of the image forming apparatus 1.

The image forming apparatus 1 includes a sheet feeding part 3 and an inkjet type image forming part 5. The sheet feeding part 3 includes a sheet feeding cassette 7 in which a sheet S is housed and a sheet feeding device 9 which feeds the sheet S from the sheet feeding cassette 7 to a conveyance path 11. The image forming part 7 includes a head unit 13, a conveyance unit 15, and a maintenance unit 17.

The head unit 13 includes four line heads 21 corresponding to ink of four colors (yellow, magenta, cyan and black). The four line heads 21 are arranged in parallel along the conveyance direction (the left direction) of the sheet S.

Figure 2A:
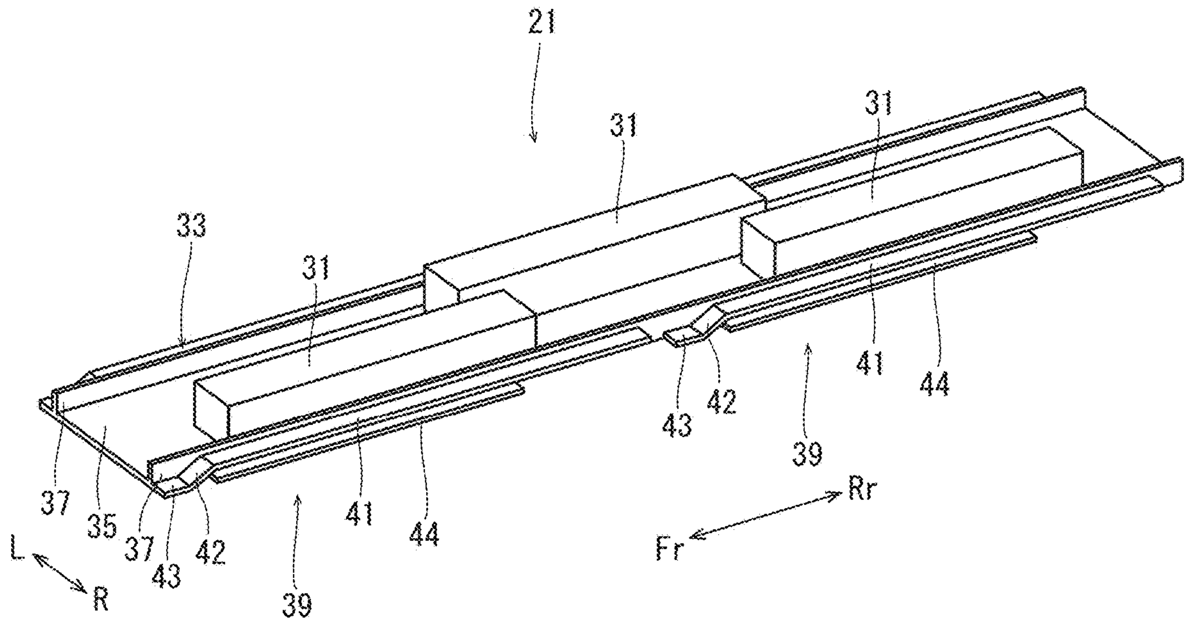
FIG. 2A is a perspective view showing a line head, in the image forming apparatus according to the embodiment of the present disclosure.
Figure 2B:
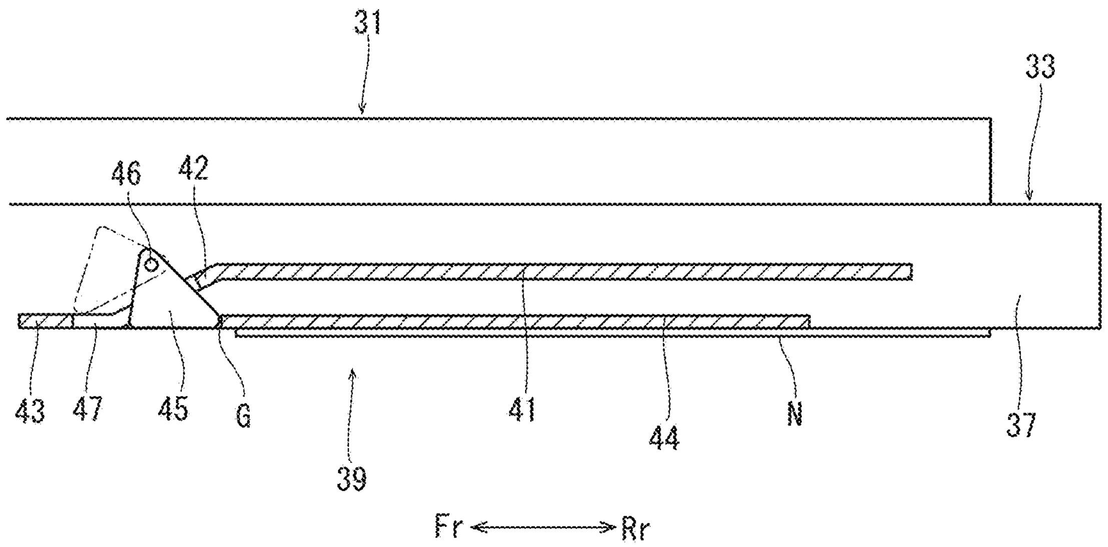
FIG. 2B is a view showing a part of the line head, when viewed from the right side, in the image forming apparatus according to the embodiment of the present disclosure.

Next, the line head 21 will be described with reference to FIG. 2A and FIG. 2B. FIG. 2A is a perspective view showing the line head 21, and FIG. 2B is a view showing a part of the line head 21 viewed from the right side. An opening/closing guide 45 is not shown in FIG. 2A.

As shown in FIG. 2A, the line head 21 has three recording heads 31 and a head base 33 on which the recording heads 31 are supported.

The recording head 31 has a rectangular parallelepiped shape long in the front-and-rear direction, and is provided with a number of nozzles arranged in the front-and-rear direction and in the left-and-right direction. The ejection port of each nozzle is opened on the lower surface of the recording head 31. The nozzle ejects the ink downward from the ejection port by an ink ejection method such as a piezo type or a thermal type. An area in which the ejection ports are opened on the lower surface of the recording head 31 is referred to as a nozzle area N (see FIG. 2B).

The head base 33 has a flat plate-like base part 35 long in the front-and-rear direction and side wall parts 37 erected along both long sides of the base part 35. The three recording heads 31 are arranged on the base part 35 in a zigzag shape along the front-and-rear direction. As shown in FIG. 2B, the recording head 31 is supported so that the nozzle area N projects downward from the lower surface of the base part 35.

As shown in FIG. 2A, on the outer surfaces of both side wall parts 37, two guide parts 39 are formed side by side in the front-and-rear direction. Each guide part 39 is formed so as to project horizontally from the outer surface of each side wall part 37. The guide part 39 includes a first guide 41, a separation guide 42 and a retreat guide 43 formed continuously, and a second guide 44 formed separately from these guides.

The first guide 41 is formed along the front-and-rear direction parallel to the nozzle area N. The separation guide 42 is inclined downward from the front end of the first guide 41 toward the front side. The retreat guide 43 extends from the front end of the separation guide 42 toward the front side in parallel with the first guide 41. The second guide 44 is formed in parallel with the first guide 41 under the first guide 41, away rearward from the retreat guide 43. The first guide 41 is formed longer in the front-and-rear direction than the recording head 31. The length of the second guide 44 along the front-and-rear direction is shorter than that of the first guide 41. The retreat guide 43 and the second guide 44 may not necessarily be parallel to the first guide 41.

As shown in FIG. 2B, the guide part 39 further includes an opening/closing guide 45 which opens and closes the gap G between the retreat guide 43 and the second guide 44. The opening/closing guide 45 is a substantially triangular member when viewed from the left-and-right direction. The opening/closing guide 45 is rotatably supported by a support shaft 46 provided on the side wall part 37 above the separation guide 42, and turns through a slit 47 formed in the separation guide 42 and the retreat guide 43.

A torsion coil spring (not shown) is disposed between the opening/closing guide 45 and the side wall part 37. The coil of the torsion coil spring is externally fitted onto the support shaft 46, one arm is fixed to the side wall part 37, and the other arm is fixed to the opening/closing guide 45. The torsion coil spring biases the opening/closing guide 45 in the direction of closing the gap G (the counterclockwise direction in FIG. 2B).

With reference to FIG. 1 again, the head unit 13 is supported in a liftable and lowerable manner in a printing position (see the solid line in FIG. 1) and a retreat position above the printing position (see the two-dotted chain line in FIG. 1).

The conveyance unit 15 includes a conveyance belt 51 that circulates in the counterclockwise direction of FIG. 1. The conveyance unit 15 is disposed such that an upper traveling surface of the conveyance belt 51 is close to the nozzle areas N of the four line heads 21 of the head unit 13 lowered to the printing position.

The maintenance unit 17 includes a capping unit 53, a cleaning unit 55, and a case 57 in which the capping unit 53 and the cleaning unit 55 are housed, and is disposed on the left side of the head unit 13.

The capping unit 53 includes a base plate and a plurality of caps arranged on the upper surface of the base plate. The caps are arranged so as to correspond to the recording heads 31 of the line heads 21 of the head unit 13. The capping unit 53 is housed in the upper portion of the inside of the case 57, and is supported in a movable manner along the left-and-right direction between a housing position housed in the case 57 and a capping position under the head unit 13 lifted to the retreat position.

Figure 3:
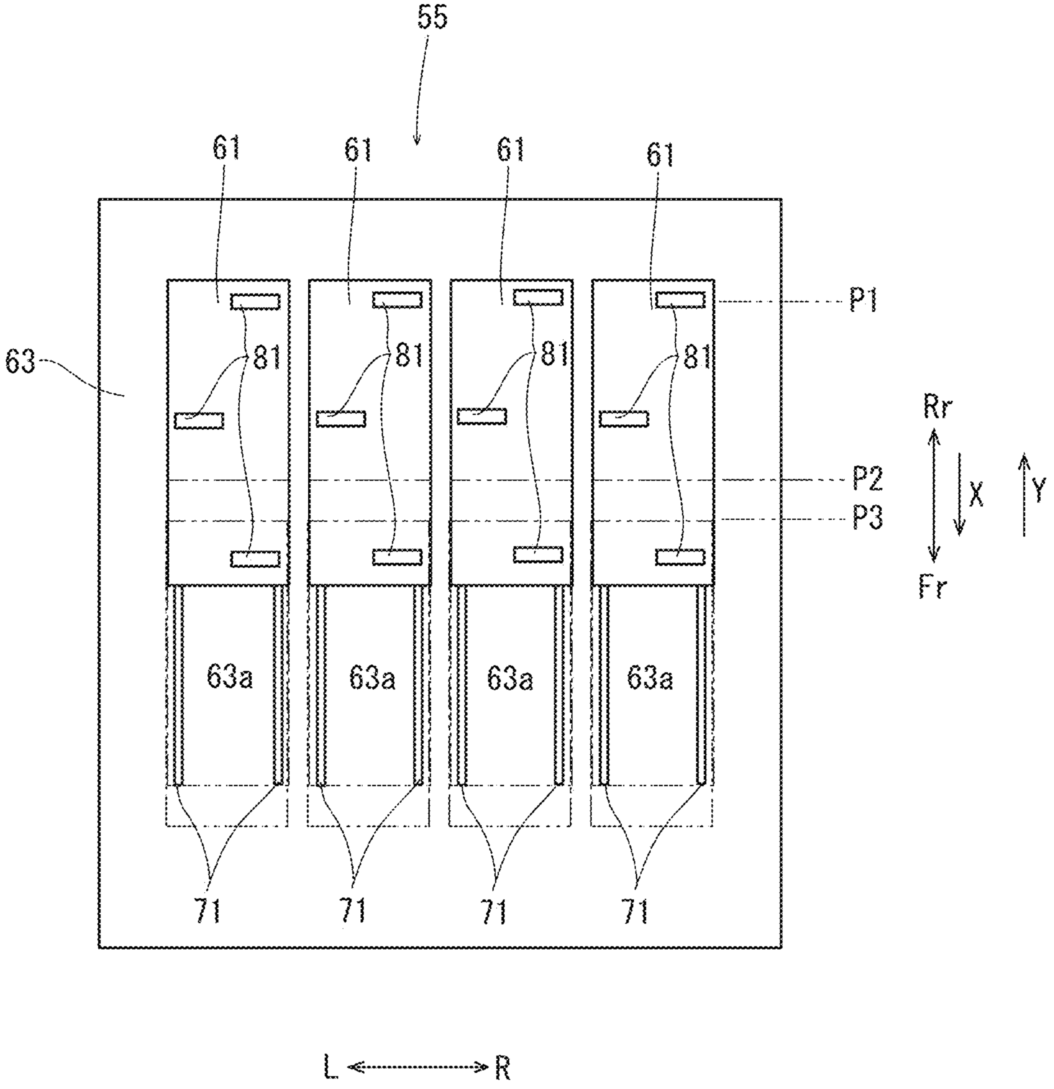
FIG. 3 is a plan view schematically showing a wiping unit, in the image forming apparatus according to the embodiment of the present disclosure.

Next, the cleaning unit 55 will be described with reference to FIG. 3. FIG. 3 is a plan view schematically showing the cleaning unit 55. The cleaning unit 55 includes four wiping units 61 arranged in parallel in the left-and-right direction, and a base plate 63 which supports the four wiping units 61 in a movable manner along the front-and-rear direction.

The four wiping units 61 are arranged so as to correspond to the four line heads 21. The wiping unit 61 wipes the nozzle area N of the corresponding recording head 31 (see FIG. 2A and FIG. 2B) of the line head 21 by moving forward along the guide part 39. Specifically, the wiping unit 61 wipes the nozzle area N by moving forward from a wiping start position P1 (see the solid line in FIG. 3) to a wiping end position P2 (see the two-dotted chain line in FIG. 3). In the following description, the forward wiping direction is referred to as the first direction X, and the rearward direction opposite to the wiping direction is referred to as the second direction Y.

The guide part 39 is provided with a first sensor and a second sensor (both are not shown). The first sensor detects the wiping unit 61 (for example, a positioning roller 93 to be described later) when the wiping unit 61 is moved to the wiping start position P1. The second sensor detects the wiping unit 61 when the wiping unit 61 (for example, the positioning roller 93 to be described later) is moved to a moving end position P3 separated by a predetermined distance from the wiping end position P2 in the first direction X. The first sensor and the second sensor are electrically connected to a controller 151 (see FIG. 5). When the wiping unit 61 reaches the wiping start position P1 and the moving end position P3, the first sensor and the second sensor transmit a signal to the controller 151.

On the base plate 63, four moving regions 63*a* in which the four wiping units 61 move in the first direction X and the second direction Y are formed. A pair of rails 71 along the first direction X and the second direction Y are formed in the moving region 63*a*. Further, two rack drive gears 73 (not shown in FIG. 3, see FIG. 5) rotatable in the first direction X and the second direction Y are supported outside the pair of rails 71. The rack drive gear 73 is driven by a motor 74 (see FIG. 5) to be rotated in one direction and the other direction. The motor 74 is electrically connected to the controller 151. The motor 74 is controlled by the controller 151 to rotate the rack drive gear 73 in one direction and the other direction.

Figure 4:
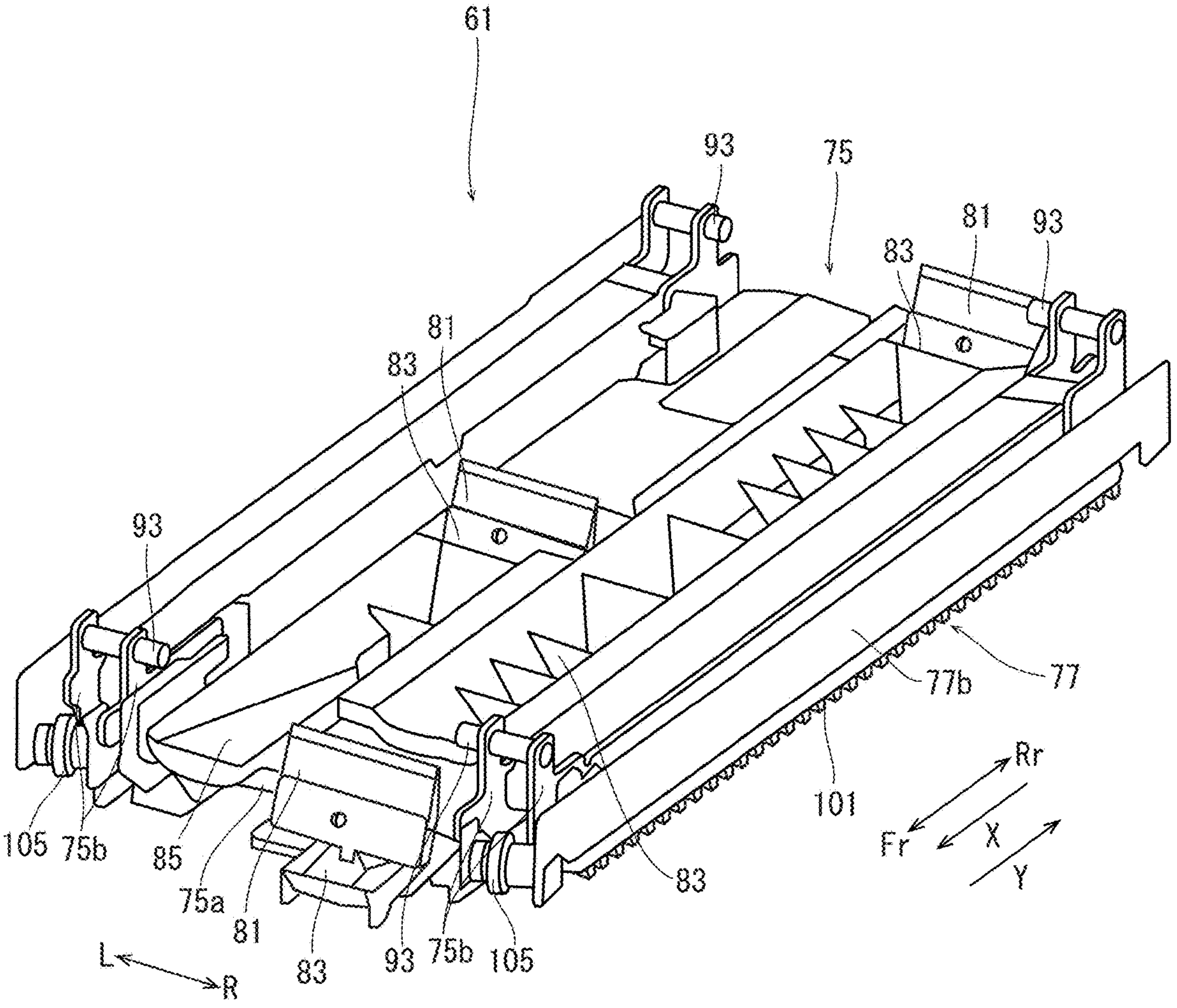
FIG. 4 is a perspective view showing the wiping unit, in the image forming apparatus according to the embodiment of the present disclosure.
Figure 5:
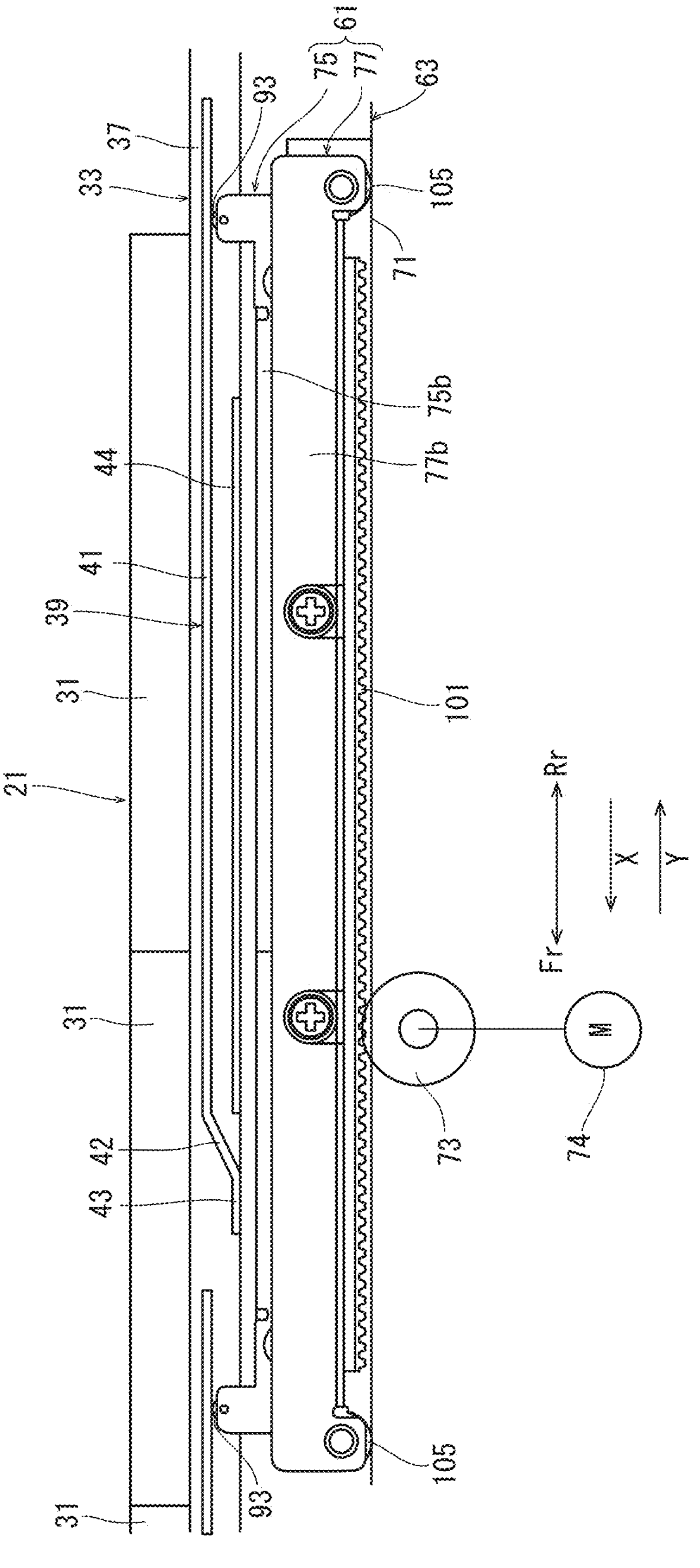
FIG. 5 is a view showing a part of the wiping unit and the line head, when viewed from the right side, in the image forming apparatus according to the embodiment of the present disclosure.
Figure 6A:
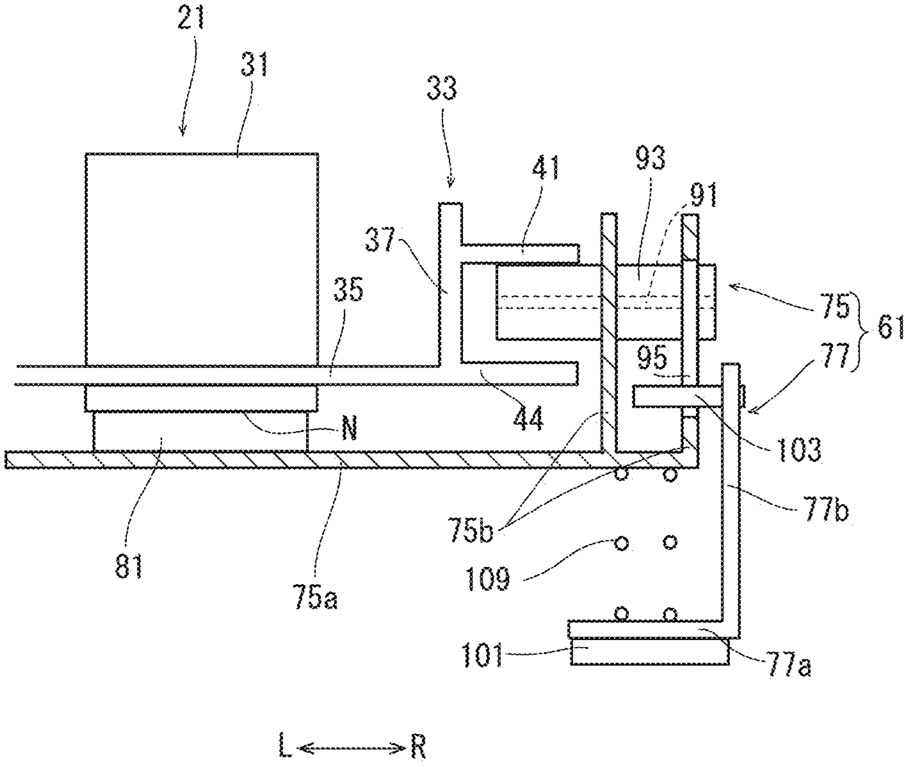
FIG. 6A is a partial sectional view schematically showing the wiping unit (in a state where a positioning roller comes into contact with a first guide), when viewed from the front side, in the image forming apparatus according to the embodiment of the present disclosure.
Figure 6B:
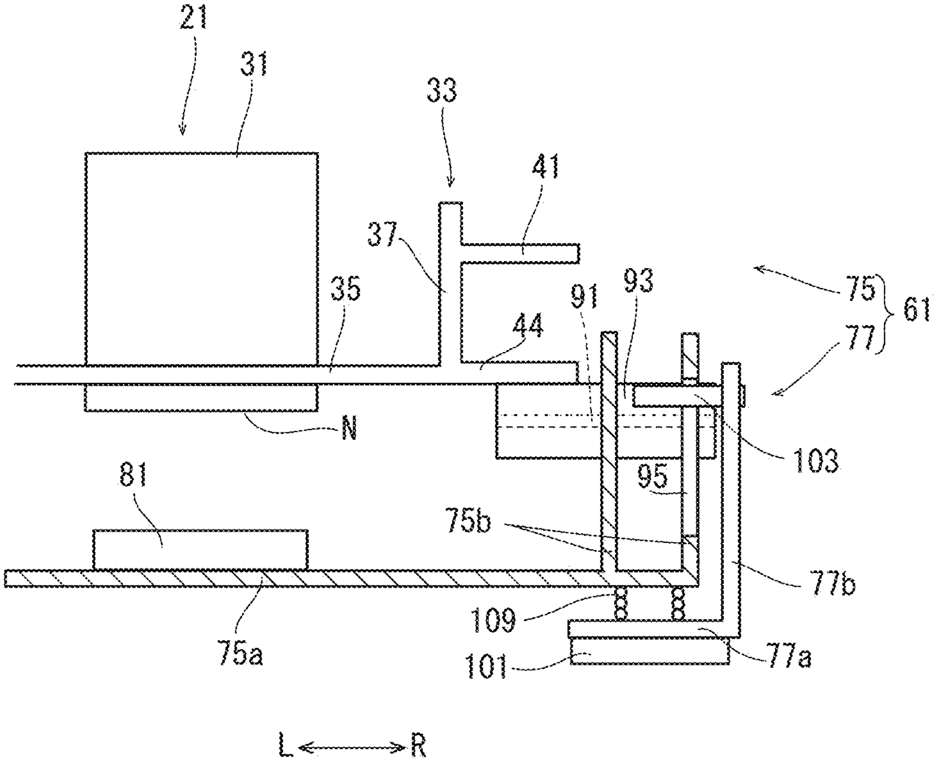
FIG. 6B is a partial sectional view schematically showing the wiping unit (in a state where the positioning roller comes into contact with a second guide), when viewed from the front side, in the image forming apparatus according to the embodiment of the present disclosure.

Next, the wiping unit 61 will be described with reference to FIG. 4 to FIG. 6B. FIG. 4 is a perspective view showing the wiping unit 61, FIG. 5 is a side view showing a part of the wiping unit 61 and the line head 21 viewed from the right direction, and FIG. 6A and FIG. 6B are partial sectional views showing the line head 21 and the wiping unit 61 viewed from the front direction. The wiping unit 61 includes a wiper support 75 and two carriages 77 which support the wiper support 75.

First, the wiper support 75 will be described. As shown in FIG. 4, FIG. 6A and FIG. 6B, the wiper support 75 has a rectangular flat bottom plate 75*a* long in the front-and-rear direction, and right and left side plates 75*b* stood along the right and left long sides of the bottom plate 75*a*. The right and left side plates 75*b* each include a pair of inner and outer side plates. As shown in FIG. 4 and FIG. 5, at the upstream and downstream end portions of the left and right side plates 75*b* in the first direction X, upper protruded pieces are formed As shown in FIG. 4, three wiper blades 81 are disposed on the bottom plate 75*a* so as to correspond to the three recording heads 31 in a posture inclined upward toward the upstream side (the rear side) in the first direction X. Further, the bottom plate 75*a* is provided with a collection part 83 in which the ink wiped off by the wiper blade 81 is stored, on the downstream side (the front side) of the wiper blade 81 in the first direction X. Further, the bottom plate 75*a* is provided with a collection part 85 in which the ink discharged when the recording head 31 is purged is stored. The ink stored in the collection parts 83 and 85 is collected through a collection port (not shown) formed in the bottom plate 75*a*.

Each of the upper protruded pieces of the left and right side plates 75*b* supports a rotation shaft 91 (see FIG. 6A and FIG. 6B) along a direction orthogonal to the first direction X and the second direction Y (the left-and-right direction). A cylindrical positioning roller 93 is rotatably supported on the rotation shaft 91. The inner end portion of the positioning roller 93 projects inward from each of the left and right side plates 75*b*. That is, as shown in FIG. 4, FIG. 6A and FIG. 6B, the positioning roller 93 is supported by the side plate 75*b* in a cantilever manner. The positioning roller 93 is an example of a roller that rotates along the guide part 39.

Further, as shown in FIG. 6A and FIG. 6B, on the upstream and downstream end portions of the outer side plate of each of the left and right side plates 75*b* in the first direction X, guide holes 95 are formed along the upper-and-lower direction Next, the carriage 77 will be described. The carriage 77 is configured to support each of the right and left end portions of the wiper support 75, and has a bottom wall 77*a* which supports the bottom plate 75*a* of the wiper support 75 from below, and a side wall 77*b* facing the outer surface of the side plate 75*b* of the wiper support 75, as shown in FIG. 6A and FIG. 6B.

On the lower surface of the bottom wall 77*a* of the carriage 77, a rack gear 101 is formed along the first direction X and the second direction Y.

As shown in FIG. 6A and FIG. 6B, at the upstream and downstream end portions of the side wall 77*b* of the carriage 77 in the first direction X, guide pins 103 are provided protruding toward the side plate 75*b* along a direction orthogonal to the first direction X and the second direction. The guide pin 103 is inserted into the guide hole 95 of the side plate 75*b* of the wiper support 75. Further, as shown in FIG. 4 and FIG. 5, the side wall 77*b* of the carriage 77 supports a moving roller 105 that rotates around an axis along a direction orthogonal to the first direction X. The moving rollers 105 are disposed at the upstream and downstream end portions in the first direction X.

As shown in FIG. 6A and FIG. 6B, a coil spring 109 as a biasing member is disposed between the bottom wall 77*a* of the carriage 77 and the bottom plate 75*a* of the wiper support 75. The coil spring 109 is disposed between the four corners of the bottom plate 75*a* of the wiper support 75 and the bottom wall 77*a* of the carriage 77, for example. The coil spring 109 biases the wiper support 75 upward relative to the carriage 77.

As shown in FIG. 3, the wiping unit 61 is disposed in the corresponding moving region 63*a* of the base plate 63. At this time, the moving rollers 105 (see FIG. 4 and FIG. 5) of the wiping unit 61 are engaged with the pair of rails 71 of the base plate 63. Further, the rack gears 101 of the wiping unit 61 are meshed with the rack drive gears 73 (see FIG. 5) of the base plate 63.

With reference to FIG. 1 again, the cleaning unit 55 is housed in the lower portion of the inside of the case 57, and is supported in a movable manner in the left-and-right direction between a housing position housed in the case 57 and a wiping position below the head unit 13 lifted to the retreat position.

Next, an image forming operation and a maintenance operation of the image forming apparatus 1 having the above configuration will be briefly described. At a time of the image forming operation, the maintenance unit 17 (the capping unit 53 and the cleaning unit 55) is moved to the housing positions. The head unit 13 is lowered to the printing position (see the solid line in FIG. 1). The sheet S fed from the sheet feeding cassette 7 by the sheet feeding device 9 is conveyed to the conveyance unit 15 along the conveyance path 11. When the sheet S is conveyed below the head unit 13 by the conveyance belt 51 of the conveyance unit 15, the ink is ejected from the nozzles of the line heads 21 according to the image data, and an image is formed on the sheet S. The sheet S on which the image is formed is conveyed along the conveyance path 11 and then discharged.

At a time of the capping operation, the head unit 13 is lifted to the retreat position (see the two-dotted chain line in FIG. 1), and the capping unit 53 is moved to the capping position. Thereafter, the head unit 13 is lowered. Thus, the caps of the capping unit 53 are brought into close contact with the lower surfaces of the recording heads 31 of the line heads 21 of the head unit 13, and a sealed space including the nozzle area N is formed between the cap and the lower surface to prevent drying of the ejection ports.

Next, the cleaning operation by the wiping unit 61 be described with reference to FIG. 7A to FIG. 8C mainly. FIG. 7A to FIG. 8C are views schematically showing the wiping unit 61 during the cleaning operation, and are views showing the wiping unit 61 viewed from the right. In each of the drawings, the wiper support 75, the carriage 77 and the others of the wiping unit 61 are shown in a simplified manner. In the cleaning operation, the head unit 13 is lifted to the retreat position, and after the cleaning unit 55 is moved to the wiping position, the head unit 13 is lowered. In the cleaning unit 55, the wiping unit 61 is positioned to the wiping start position P1 (see the solid lines in FIG. 3 and FIG. 5) of the moving region 63*a*.

Figure 7A:
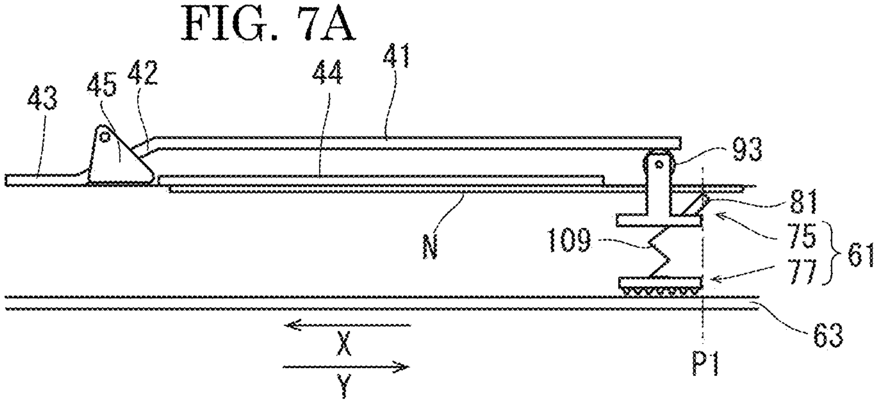
FIG. 7A is a partial sectional view schematically showing the wiping unit (in a state where the wiping unit is moved to a wiping start position), when viewed from the right side, in the image forming apparatus according to the embodiment of the present disclosure.

As shown in FIG. 7A, when the head unit 13 is lowered, the positioning roller 93 of the wiper support 75 of the wiping unit 61 comes into contact with the first guide 41 of the head base 33 of the line head 21 from below (see also FIG. 6A). Specifically, the four positioning rollers 93 of the wiper support 75 come into contact with the first guides 41 of the four guide parts 39 of the head base 33 from below. Since the wiper support 75 is biased upward against the carriages 77 by the coil spring 109, the positioning rollers 93 comes into contact with the first guide 41 at a predetermined pressure. The wiper blade 81 of the wiping unit 61 comes into contact with the lower surface of the recording head 31 at the wiping start position P1 on the upstream side of the nozzle area N in the first direction X. At this time, the line head 21 (the head unit 13) and the wiping unit 61 are positioned so that the biting amount of the wiper blade 81 is 0.2 to 0.3 mm. Thereafter, the controller 151 drives the motor 74 (see FIG. 5) in one direction to rotate the rack drive gear 73 in one direction.

Figure 7B:
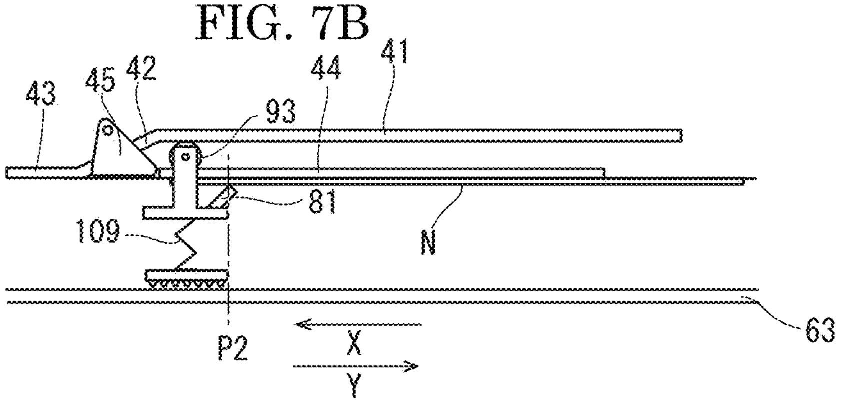
FIG. 7B is a partial sectional view schematically showing the wiping unit (in a state where the wiping unit is moved to a wiping end position), when viewed from the right side, in the image forming apparatus according to the embodiment of the present disclosure.

As a result, as shown in FIG. 7B, the rack gear 101 engaged with the rack drive gear 73 is driven to move the carriage 77 along the rail 71 and to move the wiper support 75 in the first direction X (forward).

During the moving of the wiper support 75, the positioning roller 93 moves in the first direction X while being pressed against the lower surface of the first guide 41. Thus, the nozzle area N is wiped by the wiper blade 81 while keeping the positional relationship between the wiping unit 61 and the line head 21. That is, the nozzle area N is wiped by the wiper blade 81 while keeping the biting amount of the wiper blade 81 constant. The ink wiped off by the wiping blade 81 is dropped to the collection part 83 and then collected.

When the positioning roller 93 reaches the downstream end of the first guide 41 in the first direction X, the wiper blade 81 reaches the wiping end position P2 on the downstream side of the nozzle area N in the first direction X. Thus, the wiping operation to wipe the ejection ports of the nozzle area N by the wiping unit 61 is completed.

Figure 7C:
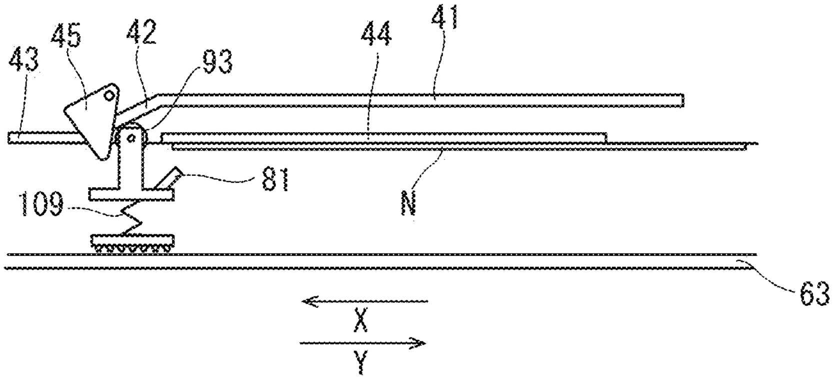
FIG. 7C is a partial sectional view schematically showing the wiping unit (in a state where the wiping unit is moved along an inclined guide), when viewed from the right side, in the image forming apparatus according to the embodiment of the present disclosure.

Thereafter, as shown in FIG. 7C, the positioning roller 93 is moved along the separation guide 42. Then, the wiper support 75 is pushed down against the biasing force of the coil spring 109, and the wiper blade 81 is separated from the lower surface of the recording head 31 (the nozzle area N). That is, the wiper support 75 is lowered. At this time, as shown in FIG. 6A and FIG. 6B, since the guide pins 103 of the carriage 77 are relatively guided to the guide holes 95 formed in the side plate 75*b* of the wiper support 75, the wiper support 75 is stably lowered.

When the positioning roller 93 comes into contact with the opening/closing guide 45 during the moving along the separation guide 42, the opening/closing guide 45 rotates in the first direction X (the clockwise direction in the drawing) against the biasing force of the torsion coil spring, and the gap G between the retreat guide 43 and the second guide 44 is opened. The positioning roller 93 is moved from the separation guide 42 to the retreat guide 43 through the opened gap G.

Figure 7D:
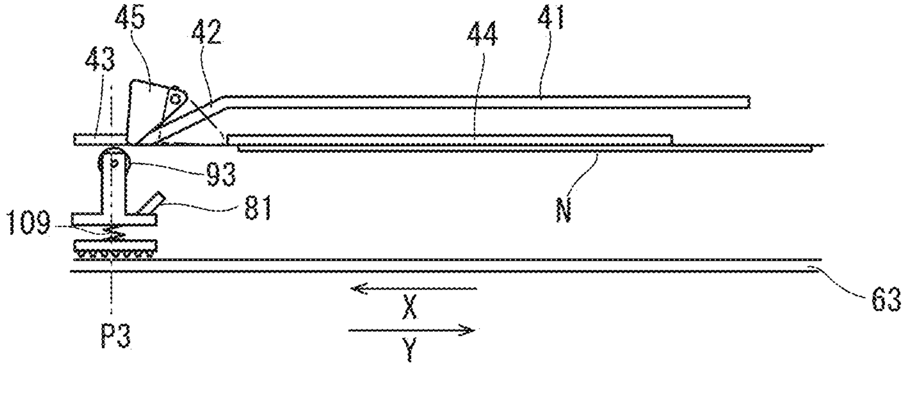
FIG. 7D is a partial sectional view schematically showing the wiping unit (in a state where the wiping unit is moved along a retreat guide), when viewed from the right side, in the image forming apparatus according to the embodiment of the present disclosure.

As shown in FIG. 7D, the positioning roller 93 is moved in the first direction X along the retreat guide 43 until it is separated from the opening/closing guide 45. When the positioning roller 93 is separated from the opening/closing guide 45, the opening/closing guide 45 is rotated by the torsion coil spring in the upstream side in the first direction X (the counterclockwise direction in FIG. 7), and the gap G is closed (refer to the two-dotted chain line in FIG. 7D). When the positioning roller 93 is moved in the first direction X along the retreat guide 43 until the gap G is closed and then reaches the moving end position P3, the second sensor detects the wiping unit 61 (the positioning roller 93) and transmits a signal to the controller 151. When receiving the signal, the controller 151 stops the driving of the motor 74 in one direction and then drives it in the other direction. Thus, the rack drive gears 73 are rotated in the other direction.

Figure 8A:
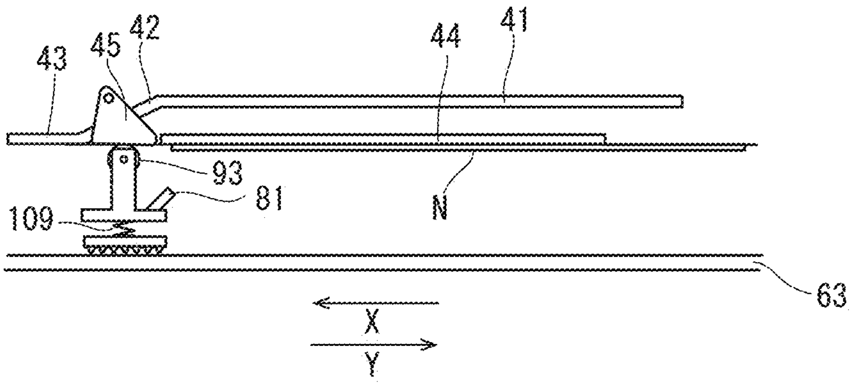
FIG. 8A is a partial sectional view schematically showing the wiping unit (in a state where the wiping unit is moved along an opening/closing guide), when viewed from the right side, in the image forming apparatus according to the embodiment of the present disclosure.

Then, the rack gears 101 engaged with the rack drive gears 73 are driven to move the carriages 77 along the rails 71, and the wiper support 75 moves in the second direction Y (rearward) as shown in FIG. 8A. The positioning roller 93 is guided from the retreat guide 43 to the opening/closing guide 45 rotated to close the gap G, and then guided along the second guide 44 (see also FIG. 6B). During this time, as described above, the wiper blade 81 is separated downward from the lower surface (including the nozzle area N) of the recording head 31.

Figure 8B:
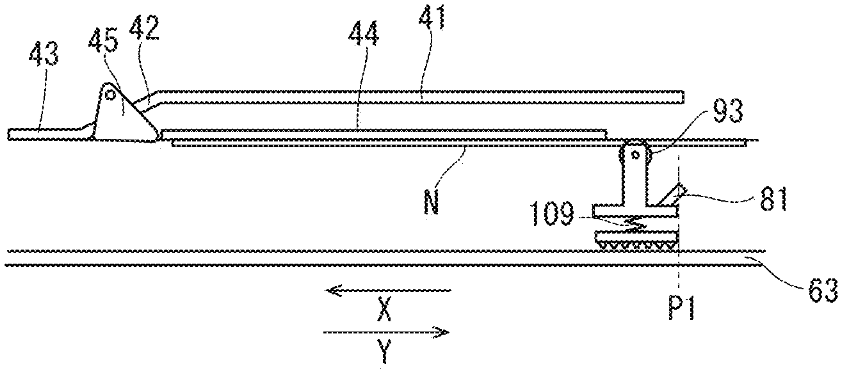
FIG. 8B is a partial sectional view schematically showing the wiping unit (in a state where the wiping unit is separated from a second guide), when viewed from the right side, in the image forming apparatus according to the embodiment of the present disclosure.
Figure 8C:
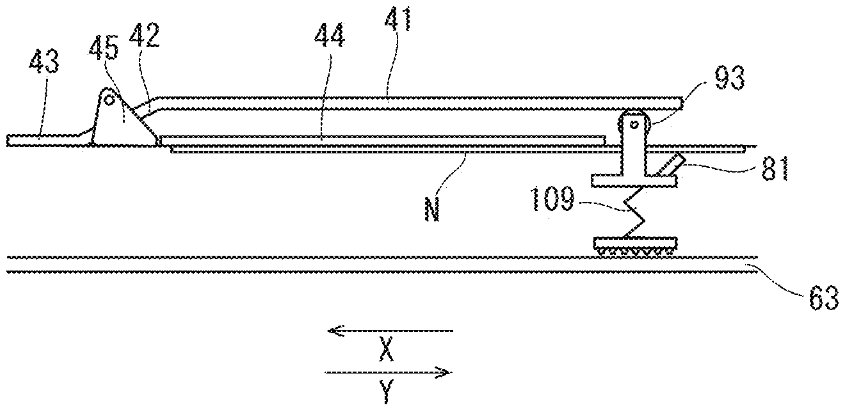
FIG. 8C is a partial sectional view schematically showing the wiping unit (in a state where the wiping unit is biased on a first guide at the wiping start position), when viewed from the right side, in the image forming apparatus according to the embodiment of the present disclosure.

As shown in FIG. 8B, when the positioning roller 93 moves in the second direction Y and separates from the second guide 44, the wiper support 75 is biased upward by the coil spring 109 so that the positioning roller 93 comes into contact with the lower surface of the first guide 41, as shown in FIG. 8C. At this time, as shown in FIG. 6A and FIG. 6B, since the guide pins 103 of the carriages 77 are relatively guided to the guide holes 95 formed in the side plates 75*b* of the wiper support 75, the wiper support 75 is lifted stably. Thus, the wiping unit 61 (the wiper blades 81) comes into contact with the lower surface of the recoding head 31 at the wiping start position P1 on the upstream side of the nozzle area N. When the wiping unit 61 reaches the wiping start position P1, the first sensor detects the wiping unit 61 and transmits a signal to the controller 151. When receiving the signal, the controller 151 stops the driving of the motor 74. In the above-described manner, a returning operation of the wiping unit 61 from the wiping end position P1 to the wiping start position P2 is completed. Thereafter, the nozzle area N can be wiped for several times by repeating the same wiping operation and returning operation as described above.

As described above, the motor 74, the rack drive gear 73, the rack gear 101, and the guide part 39 (the first guide 41, the separation guide 42, the retreat guide 43, and the second guide 44) are an example of a moving mechanism for performing the wiping operation to move the wiping unit 61 in the first direction X while bringing it into contact with the nozzle area N from the wiping start position P1 to the wiping end position P2, and the returning operation to separate the wiping unit 61 downward from the nozzle area N, to move it in the second direction and then to bring it into contact with the nozzle area N again at the wiping start position P1 after the wiping operation is completed. The motor 74 is an example of a first drive source to move the wiping unit 61 in the first direction X and the second direction Y.

As described above, according to the image forming apparatus 1 of the present embodiment, the nozzle area N can be wiped for multiple times by using the moving mechanism for causing the wiping unit 61 to perform the wiping operation and the returning operation. Specifically, the wiping operation and the returning operation include only the operation to move the wiping unit 61 in the first direction X and the operation to move the wiping unit 61 in the second direction Y.

Thus, even when the nozzle area N is wiped for multiple times, the head unit 13 does not need to be lifted and lowered, so that the time for the wiping work can be shortened. Further, since the number of times of the lifting and lowering operation of the head unit 13 can be prevented from increasing, the life of the lifting mechanism of the head unit 13 can be extended.

Specifically, by providing the separation guide 42 inclined downward from the downstream end of the first guide 41 in the first direction X, the wiping unit 61 can be separated downward from the nozzle area N by utilizing the above-described moving mechanism.

In a case where the separation guide 42 is provided in the above manner, the gap G is opened between the downstream end of the separation guide 42 in the first direction X and the upstream end of the second guide 44 in the second direction Y. Thus, by providing the retreat guide 43 to retreat the positioning roller 93 after it passes the separation guide 42 and the opening/closing guide 45 to open and close the gap G, the positioning roller 93 can be guided from the separation guide 42 along the second guide 44 through the retreat guide 43 and the opening/closing guide 45 in the returning operation.

Further, since the opening/closing guide 45 opens the gap by the contact of the positioning roller 93 moving along the separation guide 42 and closes the gap by the separation of the positioning roller 93, it is not necessary to provide a mechanism for turning the opening/closing guide 45 separately.

Figure 9A:
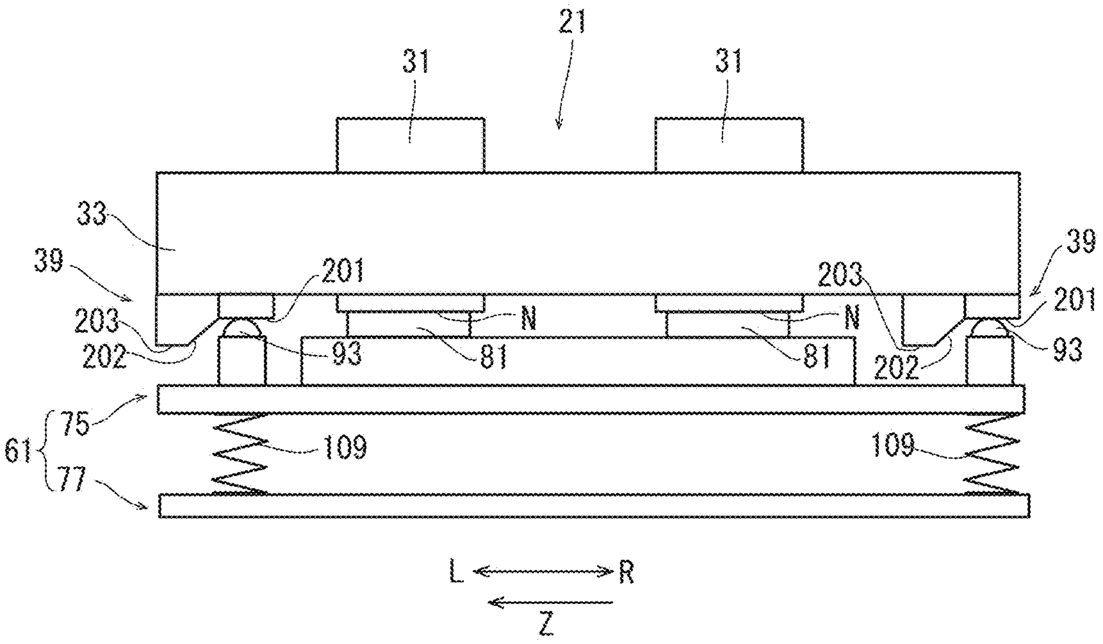
FIG. 9A is a view showing another example of the wiping unit (in a state where the wiping unit is moved along the first guide), when viewed from the front side, in the image forming apparatus according to the embodiment of the present disclosure.
Figure 9B:
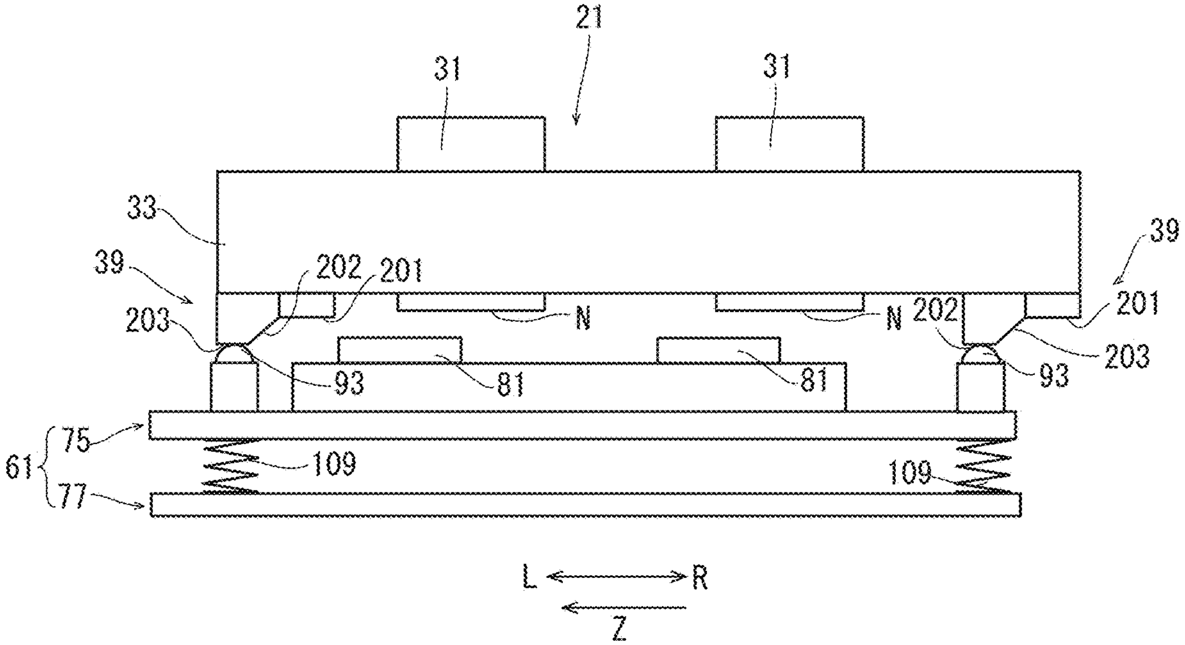
FIG. 9B is a view showing another example of the wiping unit (in a state where the wiping unit is moved along the second guide), when viewed from the front side, in the image forming apparatus according to the embodiment of the present disclosure.

Next, a modified example of the embodiment will be described with reference to FIG. 9A and FIG. 9B. FIG. 9A and FIG. 9B are views of the line head 21 and the wiping unit 61 as viewed from the front side. The members having the same configuration and functions as those of the above-described embodiment are denoted by the same reference numerals as those of the above-described embodiment, and the description thereof will be omitted.

As described above, the cleaning unit 55 is supported so as to be movable in the left-and-right direction between the housing position housed in the case 57 and the wiping position below the head unit 13 lifted to the retreat position (see FIG. 1). The direction (the left direction) from the wiping position to the housing position is defined as the third direction Z. The third direction Z is a direction intersecting the first direction X and the second direction Y. The mechanism to move the cleaning unit 55 between the housing position and the retreat position is an example of a second drive source of the present disclosure.

In the modified example, the guide parts 39 are formed at the right and left end portions of the lower surface of the head base 33 along the front-and-rear direction. The guide part 39 has a first guide 201 formed parallel to the nozzle area N along the first direction X, a separation guide 202 inclined downward from the left end of the first guide 201 (the downstream end in the third direction Z) in the third direction Z, and a second guide 203 formed along the second direction Y from the lower end of the separation guide 202. In the modified example, the positioning roller 93 has a spherical roller shape. The positioning roller 93 is an example of a roller that rotates along the guide part 39.

Next, the wiping work will be described. As shown in FIG. 9A, when the head unit 13 is lowered, the positioning roller 93 of the wiper support 75 of the wiping unit 61 comes into contact with the first guide 201 of the head base 33 from below. Thereafter, the motor 74 is driven to rotate the rack drive gear 73 in one direction. Thus, the wiper support 75 is moved in the first direction X, and the nozzle area N is wiped by the wiper blade 81. When the positioning roller 93 reaches the downstream end of the first guide 201 in the first direction X, the wiping operation is completed.

Thereafter, the cleaning unit 55 is moved in the third direction Z for a predetermined distance by the second drive source. When the cleaning unit 55 is moved in the third direction Z, the positioning roller 93 is moved along the separation guide 202. Then, the wiper support 75 is pushed down against the biasing force of the coil spring 109, and the wiper blade 81 is separated from the lower surface (the nozzle area N) of the recording head 31.

As shown in FIG. 9B, the cleaning unit 55 is moved in the third direction Z until the positioning roller 93 moves from the separation guide 202 to the second guide 203. As a result, the wiper blade 81 is completely separated from the lower surface of the recording head 31.

Thereafter, the rack drive gear 73 is rotated in the other direction, and the positioning roller 93 is guided along the second guide 203. During this time, as described above, the wiper blade 81 is separated downward from the lower surface (including the nozzle area N) of the recording head 31. When the positioning roller 93 reaches the wiping start position, the cleaning unit 55 is moved in the direction opposite to the third direction Z for a predetermined distance by the second drive source. Since the wiper support 75 is biased upward by the coil spring 109, the positioning roller 93 comes into contact with the lower surface of the first guide 201 via the separation guide 202 from the second guide 203. As a result, the returning operation is completed.

As described above, in the modified example, the nozzle area N can be wiped for multiple times by using the moving mechanism to cause the wiping unit 61 to perform the wiping operation and the returning operation and the moving mechanism to move the cleaning unit 55 between the wiping position and the housing position. Therefore, even when the nozzle area N is wiped for multiple times, the head unit 13 does not need to be lifted and lowered, so that the time for the wiping work can be shortened. Further, the number of times of the lifting and lowering operation of the head unit 13 can be prevented from increasing.

However, in this modified example, the wiping operation and the returning operation include an operation to move the wiping unit 61 in the first direction X, an operation to move it in the second direction Y, an operation to move it in the third direction Z, and an operation to move it in the direction opposite to the third direction Z. Therefore, as compared with the above embodiment, the operation to move the wiping unit 61 in the third direction Z and the operation to move it the direction opposite to the third direction Z are required, and the wiping operation time becomes longer. However, by providing the guide part 39 on the lower surface of the head base 33, it becomes possible to shorten the width of the recording head 31 in the left-and-right direction. Further, since it is not necessary to provide the retreat guide 43 and the opening/closing guide 45 of the above embodiment, the length of the guide part 39 along the front-and-rear direction can be shortened.

Although the present disclosure has been described for specific embodiments, the present disclosure is not limited to the above embodiments. Those skilled in the art may modify the embodiments described above without departing from the scope and spirit of the present disclosure.

The invention claimed is:

1. An image forming apparatus: comprising a recording head having a nozzle area where a plurality of ink ejection ports is opened downward;

a wiping unit which is moved in a first direction with coming into contact with the nozzle area and wipes the ink ejection ports; and a moving mechanism for performing a wiping operation to move the wiping unit in the first direction while bringing the wiping unit into contact with the nozzle area from a wiping start position to a wiping end position, and a returning operation to separate the wiping unit downward from the nozzle area after the wiping operation is completed, to move the wiping unit in a second direction opposite to the first direction and then to bring the wiping unit into contact with the nozzle area again at the wiping start position, wherein the moving mechanism includes:

a first drive source which moves the wiping unit in the first direction and in the second direction; and a guide part which guides the wiping unit in the first direction in the wiping operation, and guides the wiping unit in the first direction so as to separate the wiping unit from the nozzle area downward and then guides the wiping unit in the second direction in the returning operation, the guide part includes:

a first guide formed parallel to the nozzle area along the first direction;

a separation guide inclined downward and downstream from a downstream end of the first guide in the first direction; and a second guide formed along the second direction below the first guide, and the wiping unit includes:

a roller rotating along the guide part; and a biasing member which biases the roller upward to bring the roller into contact with the guide part; and in the wiping operation, the roller is guided in the first direction along the first guide, and in the returning operation, the roller is guided in the first direction along the separation guide, is guided in the second direction along the second guide, and then is biased by the biasing member to come into contact with the first guide from below after the roller is separated from the second guide.

2. The image forming apparatus according to claim 1, wherein the guide part further includes:

a retreat guide separated from the second guide by a gap and extending downstream from a downstream end of the separation guide in the first direction;

an opening/closing guide capable of opening and closing the gap;

in the returning operation, the opening/closing guide opens the gap, and after the roller is guided along the retreat guide from the separation guide through the gap in the first direction, the opening/closing guide closes the gap, and the roller is guided in the second direction along the retreat guide, the opening/closing guide and then the second guide.

3. The image forming apparatus according to claim 2, wherein the opening/closing guide is rotatably supported around a support shaft provided above the separation guide, when the roller moves along the separation guide, the opening/closing guide is pushed and rotated by the roller to open the gap, and after the roller moves to the retreat guide and separates from the opening/closing guide, the opening/closing guide is rotated to close the gap.

* * * * *